United States Patent [19]

Baize

[11] 4,259,377
[45] Mar. 31, 1981

[54] PROCESS OF MAKING PROTECTIVE GLOVES

[75] Inventor: Rene Baize, Boulogne sur Seine, France

[73] Assignee: Sofiman, Societe Anonyme, Paris, France

[21] Appl. No.: 91,987

[22] Filed: Nov. 7, 1979

Related U.S. Application Data

[63] Continuation-in-part of Ser. No. 865,590, Dec. 29, 1977, abandoned.

[30] Foreign Application Priority Data

Jan. 4, 1977 [FR] France .............................. 77 00040

[51] Int. Cl.³ .......................................... B05D 1/40
[52] U.S. Cl. ...................................... 427/346; 118/56; 118/321; 118/DIG. 4; 427/420
[58] Field of Search ................. 118/320, 321, DIG. 4, 118/52, 53, 56, 57; 427/420, 421, 422, 424, 425, 426, 427, 346, 347, 240

[56] References Cited

U.S. PATENT DOCUMENTS

| 983,743 | 2/1911 | Mertens | 118/321 |
| 1,166,850 | 1/1916 | Mertens | 118/321 |
| 2,434,125 | 1/1948 | Schweitzer | 427/425 |
| 3,802,908 | 4/1974 | Emmons | 118/320 X |
| 3,949,128 | 11/1974 | Ihara | 427/425 X |
| 3,999,507 | 12/1976 | Voermans | 118/320 X |
| 4,055,683 | 10/1977 | Alexandrovich et al. | 427/425 X |
| 4,056,644 | 11/1977 | Howard et al. | 427/425 |

FOREIGN PATENT DOCUMENTS

| 1255826 | 1/1961 | France | 118/321 |
| 1357515 | 2/1964 | France | 118/321 |

Primary Examiner—Morris Kaplan
Attorney, Agent, or Firm—Robert E. Burns; Emmanuel J. Lobato; Bruce L. Adams

[57] ABSTRACT

In making a protective glove, a lightweight fabric lining is mounted on a rotatable form beneath a distributor of fluid coating material. The form is rotated while the coating material is allowed to flow by gravity from the distributor onto the lining on the form. Initially the form is tilted so that the fingers are inclined upwardly and the coating material is flowed onto a zone embracing the junction of the fingers and thumb with the body of the glove. The form is then tilted so that the fingers are inclined downwardly and the distributor is traversed relatively to the form so as to coat successive zones of the lining until the entire lining is uniformly coated.

5 Claims, 2 Drawing Figures

PROCESS OF MAKING PROTECTIVE GLOVES

REFERENCE TO PRIOR APPLICATION

This application is a continuation-in-part of my application Ser. No. 865,590 filed Dec. 29, 1977, now abandoned.

FIELD OF INVENTION

The present invention relates to a process of manufacture of an article of clothing such as a protective glove comprising a supple lining of lightweight textile material and a protective coating of plastic material.

BACKGROUND OF THE INVENTION

It is known to manufacture protective gloves by placing a fabric liner on a rigid form and dipping the form with the lining thereon into at least one bath of fluid plastic coating material. After removal from the bath, the dipped form is drained to remove excess coating material and a heat treatment is then carried out to cure the coating composition.

As the forms are customarily dipped vertically in the bath with the fingers directed downwardly, the different hydrostatic pressures to which different portions of the lining are subjected result in non-uniform penetration of the fluid coating material into the lining. This is particularly true if the lining is of lightweight loosely knitted or woven material. With such linings, the coating material may penetrate completely through the lining in the finger portions of the glove so as to form an undesirable plastic coating inside of the fingers. To prevent such penetration it is necessary to use a relatively heavy and closely knit or woven lining material, for example a knitted fabric, having a weight of 190 g/m$^2$ or more. In the United States the linings are currently made of knitted fabric weighing up to 300 g/m$^2$. This increases the cost of the goves and results in gloves which are relatively heavy, stiff and inflexible.

Through U.S. Pat. No. 3,802,908 it is known to coat the surface of a pipe by extruding ribbons of heat softened resinous material onto the surface of the pipe while it is being rotated.

It is also known through Muller French Pat. No. 781541 and Duarry Serra French Pat. No. 255826 to manufacture articles of clothing by projecting a coating medium onto a lining provided on a form. However, the coatings thus obtained are heterogenous as far as their physical properties are concerned and do not give the advantage of employing a large range of linings of discontinuous structure. Thus in the Muller patent it is disclosed that the coating particles have spaces therebetween. In the Duarry Serra patent it is stated that the meshes of the linings are narrow and that the coating penetrates the meshes.

There is also known through Plastomeric French Pat. No. 1,357,515 a process in which a coating medium is projected onto a form provided with a lining to form articles of clothing. However, this process is only adapted for a precise and limited usage.

SUMMARY OF THE INVENTION

It is an object of the present invention to remedy the aforesaid drawbacks. In manufacturing an article of clothing comprising an internal lining of textile material and an external protective covering, it is essential that the physical characteristics of the protective material and its application and treatment remain constant in each of successive zones of the lining. This is more difficult in manufacturing articles of non-circular cross section such as gloves because they are not symmetrical and not uniform axially. Moreover, it is essential to provide a covering of uniform thickness and to avoid undesirable penetration of the coating material into or through the lining even when the lining is made of lightweight porous woven or knitted textile material.

In accordance with the present invention this is achieved by placing a form with the lining thereon vertically beneath fluid distributing means supplied with coating material for forming the covering. The coating material is permitted to flow downwardly by gravity from the distributing means onto the lining on the form while controlling the flow of coating material and rotating the form with the lining thereon about a generally horizontal axis while effecting relative movement between the distributing means and the form in a direction axial of the form to distribute the coating material progressively over the lining on the form as the coating material flows by gravity from the distributing means as a compact stream. An impervious covering thereby formed over the lining is subsequently subjected to a thermal treatment to cure the coating material.

Since the coating material is applied to all portions of the lining with uniform pressure, namely the force of gravity, a coating of uniform thickness is obtained despite the asymmetry of the article. The coating material is uniformly spread over the lining on the form by rotation of the form about its axis while the coating material flows by gravity onto the lining on the form. Any excess coating material drips off.

Moreover, since the pressure by which the coating material is applied to the lining on the form is uniform and of low value, penetration of the coating material into the lining is uniform and excessive penetration is avoided. This makes it possible to use as the lining a lightweight woven or knitted textile material which is relatively porous or "open". Thus the process according to the invention permits using the linings made of tricot that is very lightweight, for example about 150 g/m$^2$ or less, for example 130 g/m$^2$. The use of a lightweight lining achieves economy in manufacture since such lining material is less expensive and also results in an article which is lighter weight and more flexible. The process in accordance with the present invention thus has important advantages over processes heretofore known.

BRIEF DESCRIPTION OF DRAWINGS

The present invention will now be described by way of example with reference to the accompanying drawing which shows schematically apparatus for manufacturing gloves by the process of the invention. In the drawings.

DESCRIPTION OF PREFERRED EMBODIMENT

Figure 1:
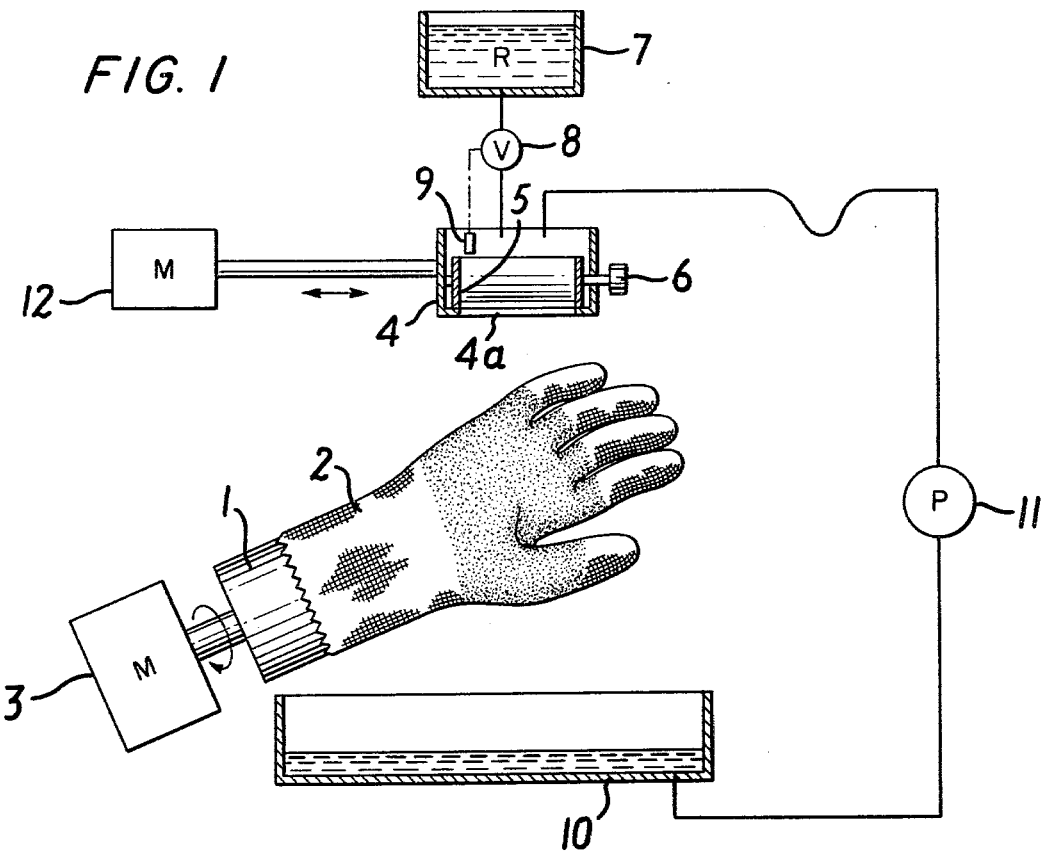
FIG. 1 is a schematic view showing the apparatus in an initial stage of manufacturing a glove.

The present invention will now be described by way of example with reference to the accompanying drawings which shows schematically apparatus for manufacturing gloves in accordance with the invention.

The apparatus is shown as comprising a rigid form 1 of known glove shape on which there is placed an inner lining 2 of textile material. While a machine for making gloves in accordance with the invention has a series of forms arranged in a circle or line, only one form is shown in the drawings. The form is of a material, or coated with a material, to which the coating material will not stick. The form 1 is slowly rotatable about a central longitudinal axis at an adjustable speed by suitable means illustrated by way of example as a motor 3. As the form 1 is slowly rotated, fluid plastic coating material is permitted to flow by gravity at ambient temperature from a distribution head 4 onto the lining on the form. The plastic coating material flows as a compact stream having a greater width in a direction axial of the form than thickness. The distribution head 4 is, for example, provided with an elongated slot 4a through which the coating material flows. Suitable means is provided for controlling the rate of flow of the coating material. Such means is shown schematically as a valve member 5 which is adjustably rotatable by a knob 6 to open or close the discharge opening or openings of the distributor head 4 a selected amount.

Fluid coating material is supplied to the distribution head 4 from a reservoir 7 under control of a valve 8. The valve 8 is preferably controlled by a level sensing device 9 in the distributor head so as to automatically keep the level of liquid in the distributor head constant. Any excess coating material which drips off the lining 2 on the form 1 is caught by a pan 10 and returned by a pump 11 to the distributor head 4.

Means is provided for effecting relative movement of the form 1 and distributor head 7 in a direction longitudinal of the form. Such means is shown by way of example as linear motor 12 for moving the distribution head 7 lengthwise of the form as the form rotates. It will be understood, however, that the distribution head can be stationary whereupon the form 1 is movable in a lengthwise direction relative to the distribution head. Alternatively the apparatus may have a series of distribution heads arranged in different lengthwise positions at successive operating stations, in which case the form is moved from one station to the next to effect relative change of positions of the form relative to the distribution head in a lengthwise direction.

Figure 2:
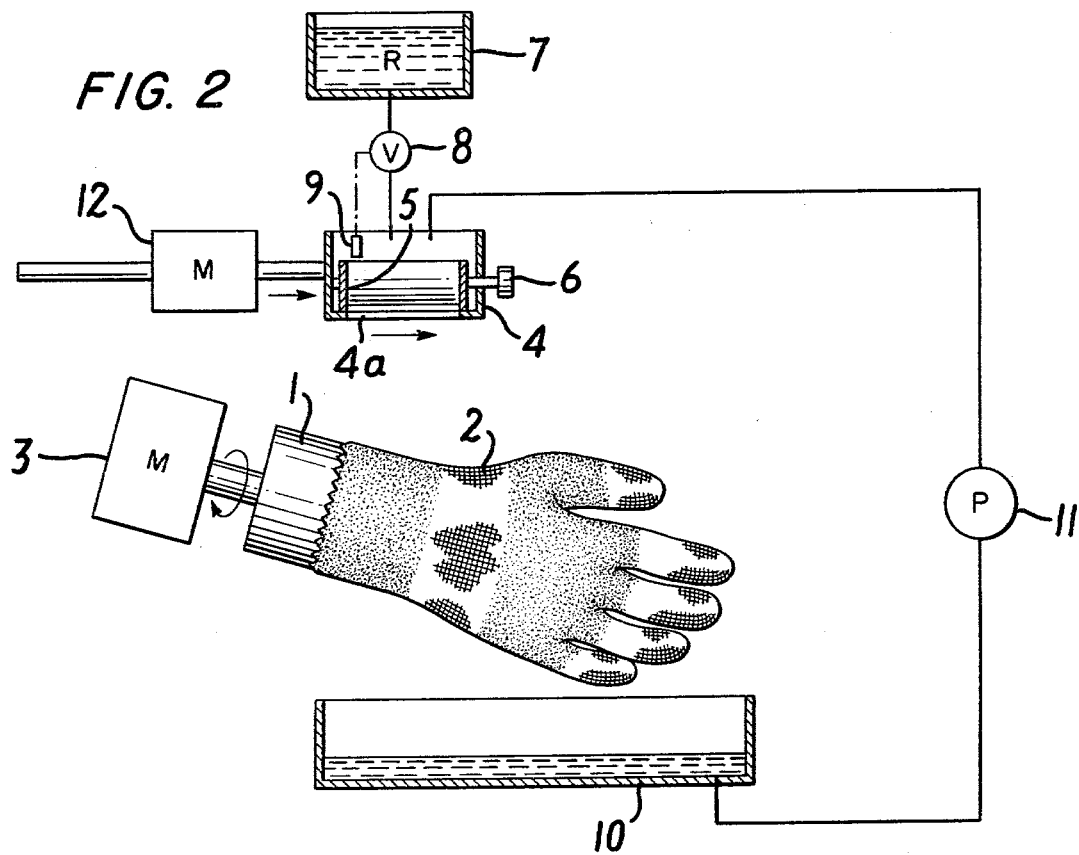
FIG. 2 shows the apparatus in a subsequent stage.

In a preferred embodiment of the invention, the form 1 is tiltable about a horizontal axis perpendicular to its axis of rotation between a position in which the fingers of the glove form are inclined upwardly and a position in which the fingers are inclined downwardly. In the manufacture of a glove, the form 1 is initially tilted with the fingers inclined upwardly as shown in FIG. 1 and coating material is permitted to flow by gravity from the distributor head 4 onto a zone which includes the junctions of the fingers and the thumb with the body or palm portion of the glove. This assures a proper coating of the portions of the lining between the fingers and between the thumb and forfinger. The form with the glove lining thereon is thereafter tilted so that the fingers are inclined downwardly as shown in FIG. 2 and the balance of the lining is coated in a zone-by-zone manner, as the form continues to rotate, by positioning the distributor head relative to the form to coat a first zone and then effecting relative movement of the distributor head and form in a lengthwise direction to coat other zones successively. Relative lengthwise movement of the distributor head and form may be continuous or stepwise to effect zone-by-zone coating. When the lining on the form has been completely and uniformly coated, the flow of coating material from the distributor head 4 is stopped.

Rotation of the form is preferably continued, with the form in the tilted position shown in FIG. 2, while heat is applied, for example by gas heat, electrical heat, infrared lamps or microwave radiation, to cure the coating material. The continued rotation of the form during curing assures that the uniformity of the coating on the lining is maintained and that the curing of the coating material is uniform. The form may, if desired, be transferred to a different operating station for curing. After the coating material is cured, the completed glove is removed from the form.

In the process of the present invention, it is possible to use for the lining a knitted or woven textile material which is lightweight and relative porous or "open". The lining may be of suitable material, for example cotton, rayon, polyester, polyamide, etc. The count of the thread used in the fabric of the lining in the process of the invention is preferably between 1/30 and 1/60. The following are examples of the fabrics suitably for use as a lining in accordance with the present invention:

20–24 gauge interlock fabric having a weight of 150 g/m$^2$ of which the threads are 1/56 to 1/60, i.e. 56-60 kg per km, in cotton or a mixture of cotton and rayon.

Jersey fabric having a weight of 150 g/m$^2$, the thread being half 1/28 and half 1/56 and the composition being cotton or a cotton-rayon mixture. Such linings can satisfactorily be used with the process of the present invention, whereas if they were used in the manufacture gloves by the known dipping process, there would be undesirable penetration of the coating material through the fabric in lower portions of the glove owing to the hydrostatic pressure differential.

The linings can be obtained by cutting a piece of material with a punch press, each lining comprising two pieces assembled by stitching. One can also use seamless linings obtained by knitting on known glove knitting machines of 12 or 13 gauge, for example with threads which are half 1/28 and half 1/56 of cotton or a cotton-rayon mixture.

The following are non-limiting examples of plastic coating material that can be used in carrying out the process of the present invention, the proportions being given in parts per weight.

EXAMPLE I

| Material | Amount |
| --- | --- |
| P.V.C. Resin Emulsion | 100 |
| Diethylhexylphtalate | 100 |
| Butylbenzylphtalate | 40 |
| Colorant | 2 |
| Chalk | 10 |
| Calcium Stearate Paste | 5 |

EXAMPLE II

| Material | Amount |
| --- | --- |
| P.V.C. Resin Emulsion | 100 |
| Diisodecylphtalate | 100 |
| Butylbenzylphtalate | 20 |
| Colorant | 2 |
| "Ircogel" | 2 |
| Calcium Stearate | 5 |
| Epoxided Soya Bean Oil | 5 |

The P.V.C. resin emulsion is, for example, manufactured by Goodyear under the name WOS. The diisodecylphtalate and butylbenzylphtalate are plasticizers. The "Ircogel" is a trademark for a thickening agent. The calcium stearate is a thermal stabilizer plasticizer. As a colorant, iron oxide and chromium oxide made into a paste with dioctylphtalate can, for example, be used. By reason of the manner in which the coating material is applied to the lining on the form, the process in accordance with the present invention permits the utilization of plastisols which normally cannot be used in a dipping process.

In general, the process in accordance with the present invention permits the utilization of plastisols of which the fluidity is of the order of 40 poise measured on a Brookfield instrument at 20 revolutions per minute. These plastisols may be plasticized up to about 145 phr. They are suitable for use on a lightweight lining material for example interlock or Jersey fabric having a weight of 150 g/m$^2$. With other plastisols having smaller amount of plastification, it is possible to use interlock or Jersey fabric having a lighter weight. For example with plastisol having 110 phr, a lining having a weight of 130 g/m$^2$ may be used.

As the resin of the plastisol, polyvinyl chloride, polyvinyl acetate, their copolymers and polyvinylidene chloride can be used. Examples of plasticizers that can be used are esters of adipique acides, phthalics, axelics, chlorinated paraffines, certain derrivatives of glycols, and of phosphates, etc.

As regards the apparatus, the discharge orifice of the distributor head may, for example be of the order of 150 mm long and 4 mm wide. The distance between the distributor head and the glove is of the order of 3 cm. The speed of rotation of the form is of the order of 5 to 20 turns per minute. The rate of movement of the distribution head relative to the form is such that it moves over and back in about 10 seconds to complete the coating of a lining on a form. Approximately 5 liters of coating material are used for a pair of gloves having a length of about 27 cm.

In use, the process described above covers a lining on the form zone-by-zone in a successive manner so that the coating obtained has the same physical properties throughout. The complete coating of the lining to provide a glove of the desired characteristics is accomplished in a single coating operation. The coating applied may have either a smooth or a pebble finish. For example if the lining is cotton and is singed before coating, the finish is smooth. If the lining is cotton without any singing, a pebble finish is obtained. Contrary to known methods of dipping or projection, the bonding of the coating to the lining by the process of the present invention is more regular and stronger which gives the gloves higher quality and permits a greater choice to be made as to the lining used. The method according to the invention can be used for making protective gloves and also for recovering a lining in the form of a glove and more generally to other articles of clothing.

What is claimed is:

1. A process of manufacturing an article of clothing of non-circular cross section such as a protective glove having a supple internal lining of light weight, porous woven or knitted textile material and an external protective covering, which comprises providing a form having the shape of the desired article, fitting a supple lining of lightweight porous woven or knitted textile material on said form, placing said form with said lining thereon vertically beneath a fluid distributing means supplied with fluid coating material for forming said covering and provided with means for controlling the flow of said coating material from said distributing means, permitting said coating material to flow downwardly by gravity from said distributing means onto said lining on said form while controlling the flow of said coating material and rotating said form with said lining thereon about a generally horizontal axis while effecting relative movement between said distributing means and said form in a direction axial of said rotating form to distribute said coating material progressively over said lining on said form as said coating material flows by gravity from said distributing means as a compact stream having greater width than thickness, and thereby forms an impervious covering over said lining, said form being initially tilted during said rotation so that the fingers of the form and lining are inclined upwardly while said coating material is flowed onto a zone embracing the junction of the fingers with a body portion, and said form then being tilted during said rotation with the fingers inclined downwardly while said coating material is flowed successively onto other zones of said lining on said form until the entire lining is coated, and thereafter subjecting said covering to a thermal treatment to cure said coating material covering said lining.

2. A process according to claim 1, in which during said movement the distributing means is stationary and said form is moved axially while being rotated.

3. A process according to claim 1 in which during said relative movement the distributing means is moved axially of said form while said form is being rotated.

4. A process according to claim 1, in which said coating material is flowed from said distributing means as a stream having greater width than thickness.

5. A process according to claim 1, in which said lining is made of tricot having a weight not exceeding 150 g/m$^2$.

* * * * *